United States Patent
Qiao et al.

(10) Patent No.: US 10,356,824 B2
(45) Date of Patent: Jul. 16, 2019

(54) NETWORK CONTROLLER, NODE DEVICE AND MESH NETWORK SYSTEM THEREOF

(71) Applicant: Silergy Semiconductor Technology (Hangzhou) LTD, Hangzhou, ZheJiang Province (CN)

(72) Inventors: Junjie Qiao, Hangzhou (CN); Wenxiang Xie, Hangzhou (CN); Haidong Zhu, Hangzhou (CN); Linyan Liu, Hangzhou (CN); Zhibin Ruan, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 15 days.

(21) Appl. No.: 15/648,341

(22) Filed: Jul. 12, 2017

(65) Prior Publication Data
US 2018/0027587 A1    Jan. 25, 2018

(30) Foreign Application Priority Data
Jul. 20, 2016    (CN) .......................... 2016 1 0581197

(51) Int. Cl.
*H04B 7/155*    (2006.01)
*H04J 3/16*    (2006.01)
(Continued)

(52) U.S. Cl.
CPC ...... *H04W 74/085* (2013.01); *H04B 7/15542* (2013.01); *H04J 3/16* (2013.01);
(Continued)

(58) Field of Classification Search
CPC ............ H04B 7/15542; H04B 7/15592; H04L 5/0028–0046; H04L 5/0058–0096; H04J 3/16–1605; H04J 3/1682–1694; H04W 8/005; H04W 8/22–245; H04W 12/02–12; H04W 24/02; H04W 28/02–0263; H04W 28/06–085; H04W 40/12–16; H04W 40/22–32; H04W 48/08–16; H04W 52/0229;
(Continued)

(56) References Cited

U.S. PATENT DOCUMENTS 7,864,682 B2    1/2011    Appaji et al.
8,385,345 B2    2/2013    Ji et al.
(Continued)

FOREIGN PATENT DOCUMENTS

CN    105681189 A    6/2017
WO    WO-2006049415 A1 *    5/2006    ............ H04W 74/02
(Continued)

*Primary Examiner* — Timothy J Weidner
(74) *Attorney, Agent, or Firm* — Michael C. Stephens, Jr.

(57) ABSTRACT

An apparatus can include: (i) a network controller in a mesh network, the network controller being configured to send a beacon in a predetermined beacon slot in a broadcast manner, where the beacon includes a slot allocation state of the mesh network; and (ii) a plurality of node devices, where each node device is configured to synchronize according to the beacon, and to send a data packet within a corresponding fixed time slot according to the slot allocation state, where each of the fixed time slots corresponds to only one of the plurality of node devices.

18 Claims, 12 Drawing Sheets

(51) Int. Cl.
  *H04L 5/00* (2006.01)
  *H04W 12/06* (2009.01)
  *H04W 24/02* (2009.01)
  *H04W 28/02* (2009.01)
  *H04W 40/12* (2009.01)
  *H04W 40/24* (2009.01)
  *H04W 52/02* (2009.01)
  *H04W 56/00* (2009.01)
  *H04W 72/02* (2009.01)
  *H04W 74/04* (2009.01)
  *H04W 74/08* (2009.01)
  *H04W 84/18* (2009.01)
  *H04W 72/04* (2009.01)

(52) U.S. Cl.
  CPC ........... *H04L 5/0096* (2013.01); *H04W 12/06* (2013.01); *H04W 24/02* (2013.01); *H04W 28/021* (2013.01); *H04W 40/125* (2013.01); *H04W 40/244* (2013.01); *H04W 52/0229* (2013.01); *H04W 56/0015* (2013.01); *H04W 72/0433* (2013.01); *H04W 72/0446* (2013.01); *H04W 74/04* (2013.01); *H04W 84/18* (2013.01); *Y02D 70/00* (2018.01); *Y02D 70/142* (2018.01); *Y02D 70/144* (2018.01); *Y02D 70/162* (2018.01); *Y02D 70/20* (2018.01); *Y02D 70/22* (2018.01)

(58) Field of Classification Search
  CPC ......... H04W 56/001–0025; H04W 72/005–14; H04W 74/002–06; H04W 74/0816; H04W 74/085; H04W 84/12; H04W 84/18–22; H04W 88/04; H04W 88/08; H04W 92/10; H04W 92/18; H04W 92/20
  See application file for complete search history.

(56) References Cited

U.S. PATENT DOCUMENTS

| | | | |
|---|---|---|---|
| 8,391,255 B2 | 3/2013 | Ribiere et al. | |
| 2009/0067389 A1* | 3/2009 | Lee | H04W 74/02 370/336 |
| 2014/0003401 A1* | 1/2014 | Lim | H04W 72/0446 370/336 |
| 2014/0126558 A1* | 5/2014 | Kim | H04W 74/04 370/336 |

FOREIGN PATENT DOCUMENTS

| | | | | |
|---|---|---|---|---|
| WO | WO-2013012136 A1 * | 1/2013 | ............ | H04W 74/04 |
| WO | WO-2013022176 A1 * | 2/2013 | ........ | H04W 72/0446 |

* cited by examiner

NETWORK CONTROLLER, NODE DEVICE AND MESH NETWORK SYSTEM THEREOF

RELATED APPLICATIONS

This application claims the benefit of Chinese Patent Application No. 201610581197.1, filed on Jul. 20, 2016, which is incorporated herein by reference in its entirety.

FIELD OF THE INVENTION

The present invention generally relates to communication technology, and more particularly to node devices, network controllers, and mesh network systems.

BACKGROUND

With the development of Internet of Things (IOT) technology, more and more intelligent pieces of equipment are being connected to networks. Mesh networks have garnered increasing attention due to its dynamic extensibility, higher connectivity, higher reliability, and higher stability, as compared to other approaches. Intelligent equipment as terminals may initially be connected to a mesh network, and then can be connected to other networks of the same or different types, in order to achieve remote management, timing control, parameter regulation, and other functions.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

The mesh network is a network architecture that includes a network controller and a plurality of node devices. There may be one or more network controllers, and a plurality of node devices. The controller can be used for a communication schedule between the nodes, and for a communication route between the nodes and an external network. A node device can access the external network via the network controller. At any particular time, usually only one network controller controls the network. In one approach, the controller can implement a mesh network by broadcasting under various protocols. For example, a mesh network can be based on the Bluetooth protocol, such as the Bluetooth Low Energy (BLE) protocol.

In the mesh network, data can be forwarded via adjacent nodes, instead of direct connections over relatively long distances, which is known as multi-hop communication. The node device can forward a received data packet to implement a transfer of data. In this way, a node can be used as a relay node to pass messages. However, the control protocol of a mesh network system can be relatively complex, which may result in more operations of the node device for data communication and data exchange. As a result, it may be difficult to reduce the power consumption of the node device.

In one approach, a multi-hop mesh network can be realized based on wireless local area network (WLAN) technology, ZigBee technology, and/or Bluetooth technology. As described herein, a mesh network based on BLE is primarily utilized. However, those skilled in the art will recognize that particular embodiments are suitable for any other network communication system for realizing a multi-hop mesh network.

In one embodiment, an apparatus can include: (i) a network controller in a mesh network, the network controller being configured to send a beacon in a predetermined beacon slot in a broadcast manner, where the beacon includes a slot allocation state of the mesh network; and (ii) a plurality of node devices, where each node device is configured to synchronize according to the beacon, and to send a data packet within a corresponding fixed time slot according to the slot allocation state, where each of the fixed time slots corresponds to only one of the plurality of node devices. In another embodiment, a node of a mesh network can include: (i) a radio controllable to transmit and receive data; and (ii) a control device being configured to synchronize according to a beacon of a network controller broadcasted in a beacon slot, and to send a data packet in the corresponding time slot according to a slot allocation state, where each of the time slots corresponds to only one node device of a plurality of node devices in the mesh network. In yet another embodiment, a network controller of a mesh network can include: (i) a radio controllable to transmit and receive data; and (ii) a control device configured to generate a beacon including a slot allocation state of the mesh network, and to control the radio to send the beacon in a predetermined beacon slot, where the slot allocation state represents an allocation state of a fixed time slot.

Figure 1:
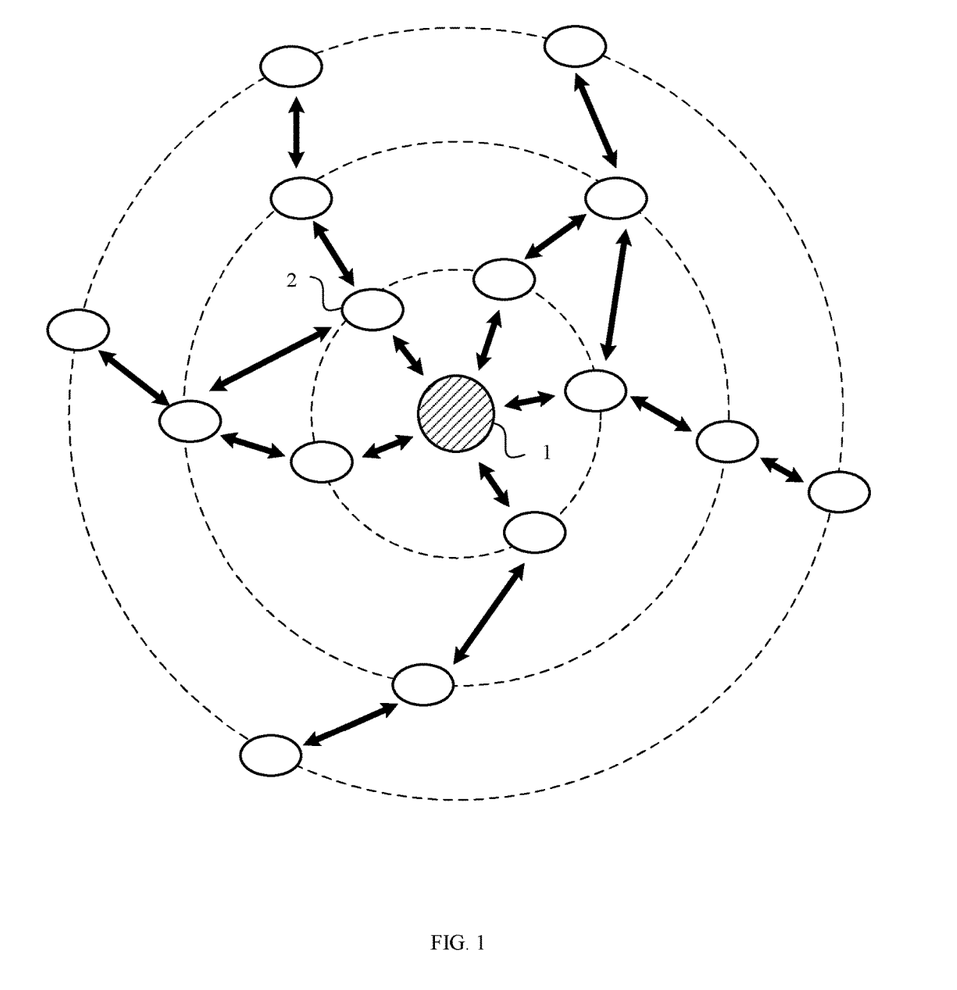
FIG. 1 is a topology diagram of an example mesh network system, in accordance with embodiments of the present invention.

Referring now to FIG. 1, shown is a topology diagram of an example mesh network system, in accordance with embodiments of the present invention. In this example, the mesh network system can include network controller 1 (also referred to as a master node) and a plurality of node devices 2 (also referred as slave nodes). Network controller 1 can be an intelligent terminal, such as a mobile phone, a computer, a tablet computer, etc., or may be a dedicated network controller. Node device 2 can be an intelligent node or other intelligent devices (e.g., a television, a refrigerator, a water heater, an LED light, a camera, a monitor, a socket, a timer, etc.), with a network connection function. Network controller 1, as the center of the mesh network, may communicate directly with node device 2 located in the vicinity thereof, and may also communicate with other node devices 2 farther away by one-hop or multi-hop data forwarding.

Network controller 1 can communicate with an external network based on a wireless local area network protocol, a mobile communication protocol, or a Bluetooth protocol, and network controller 1 can communicate with a plurality of nodes. Also, one node can communicate with another node based on a Bluetooth protocol, a ZigBee protocol, and/or a wireless local area network protocol. In this particular example, the BLE protocol may be employed. Network controller 1 can control not only the internal data communication in a mesh network, but may also provide routing functionality for communication between the mesh network and an external network. In this way, the plurality of nodes in the mesh network system can access the external network via the network controller.

Network controller 1 can send a beacon in a predetermined beacon slot in a broadcast manner, and the beacon can include a slot allocation state of the mesh network. The beacon may provide a timing reference for the entire mesh network, and also may provide a slot allocation state for all node devices 2. Accordingly, the node devices can synchronize according to the beacon, and may send a data packet within a corresponding fixed time slot according to the slot allocation state. Each of the fixed time slots can correspond to only one node device 2. Thus, each of the fixed time slots may be allocated to only one node device of the mesh network. Also, one node device 2 or network controller 1 may correspond to a plurality of dedicated fixed time slots. In a fixed time slot, a corresponding node device 2 or network controller 1 may send a data packet in a broadcast manner.

All devices in the mesh network can remain in the receiving state. When the data packet sent in the broadcast manner is received, it can be determined whether or not the destination address is their own address. If so, it can be processed. If not, it may be determined whether or not the data packet is in compliance with the forwarding condition. If so, the data packet may be forwarded within the fixed time slot corresponding to the node device. By pre-allocating fixed time slots, each device can be broadcasted in a non-conflicting time slot, and a collision prevention mechanism may be achieved with lower expense. Particular embodiments can effectively simplify the network control flow and improve the security and robustness of the network by synchronizing the operation of the mesh network, and constructing the collision prevention mechanism based on the time slot. For example, a predetermined number of dynamic time slots can be set in an adjacent beacon slot interval besides fixed time slots. Different from the fixed time slot, any devices in the mesh network can randomly select and use the dynamic time slots.

Figure 2:
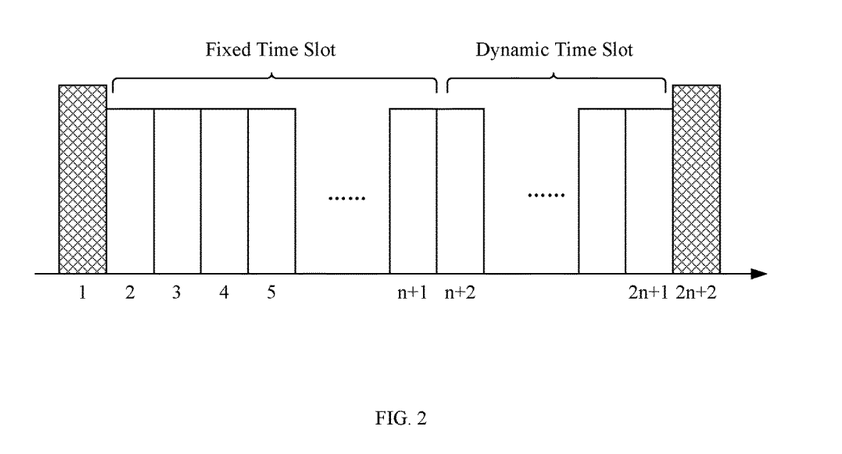
FIG. 2 is a structure diagram of an example time slot of a mesh network system, in accordance with embodiments of the present invention.

Referring now to FIG. 2, shown is a structure diagram of an example time slot of a mesh network system, in accordance with embodiments of the present invention. In this example, the first time slot and the $(2n+2)$th time slot are beacon slots for exclusively sending beacons for network controller 1. In addition, "n" fixed time slots (from the second time slot to the $(n+1)$th time slot) and "n" dynamic time slots (from the $(n+2)$th time slot to the $(2n+1)$th time slot) can be provided between every two adjacent beacon slots. The fixed time slots can be allocated to node devices 2 or network controller 1 of the mesh network for sending data packets.

The dynamic time slots can be randomly selected by devices for sending data packets. Thus, node devices 2 and network controller 1 can randomly select dynamic time slots for sending data packets, and the dynamic time slots and the fixed time slots may be located between every two adjacent beacon slots. Further, the fixed time slots and the dynamic time slots may be different in number and can be allocated in a mutually spaced manner. The combination of fixed time slots and dynamic time slots can make the devices in the mesh network not have to wait to resend until the next fixed time slot after a failure to send in the current fixed time slot. The devices can directly resend by randomly selecting an opportunity in the subsequent dynamic time slots, in order to further optimize the collision prevention mechanism and improve the robustness of the network.

Figure 3:
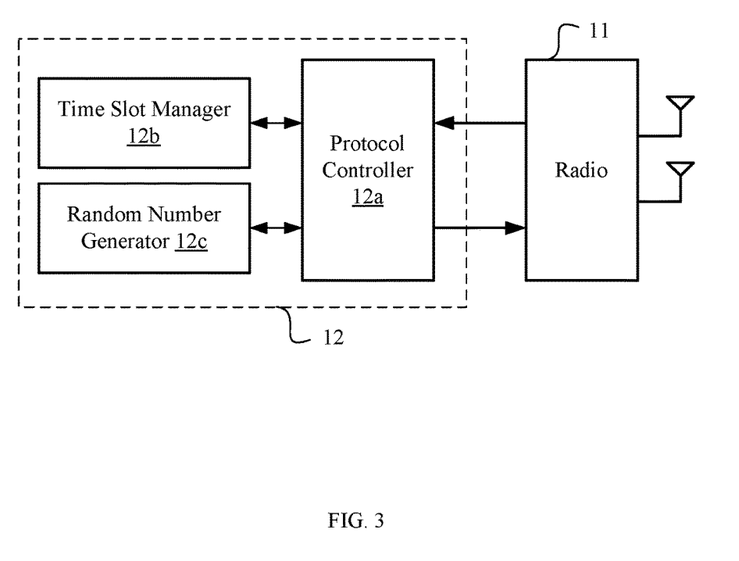
FIG. 3 is a structure diagram of an example network controller, in accordance with embodiments of the present invention.

Referring now to FIG. 3, shown is a structure diagram of an example network controller, in accordance with embodiments of the present invention. In this example, network controller 1 can include radio 11 and control device 12. Radio 11 can be controlled to transmit and receive data. Control device 12 can control radio 11 to transmit and receive data in a predetermined manner, in order to perform various operations, such as networking, communication, and network topology adjustment of the mesh network system. Control device 12 can include protocol controller 12a, time slot manager 12b, and random number generator 12c. Random number generator 12c can generate a random number between 1 and n. Time slot manager 12b can manage the fixed time slot, or may randomly select the dynamic time slot when data needs to resend according to the random number generated by random number generator 12c. Protocol controller 12a can construct beacons, or deliver the data packet to radio 11 for transmitting or analyze the data packet received by radio 11 according to the time slots selected by time slot manager 12b. Those skilled in the art will recognize that the above mentioned protocol controller 12a, time slot manager 12b, and random number generator 12c can be implemented as separate integrated circuits or other circuits or modules that can be executed by control device 12.

Figure 4:
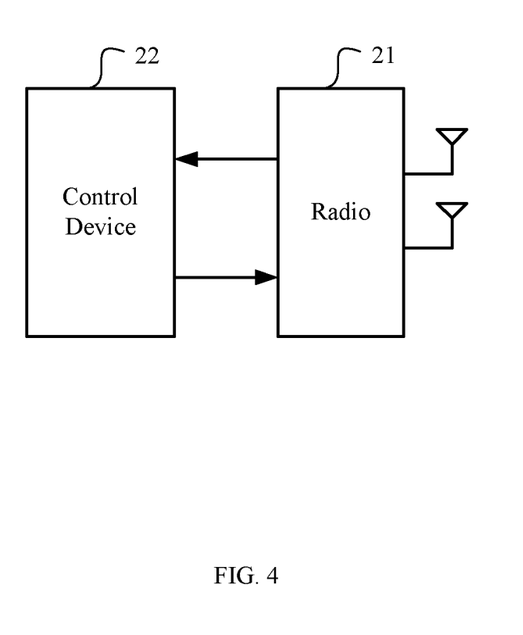
FIG. 4 is a structure diagram of an example node device, in accordance with embodiments of the present invention.

Referring now to FIG. 4, shown is a structure diagram of an example node device, in accordance with embodiments of the present invention. In this example, node device 2 can include radio 21 and control device 22. Radio 11 can be controlled to transmit and receive data. Control device 22 can control radio 21 to transmit and receive data in a manner corresponding to network controller 1, in order to perform various operations, such as networking, communication, and the like, of the node device.

Figure 5:
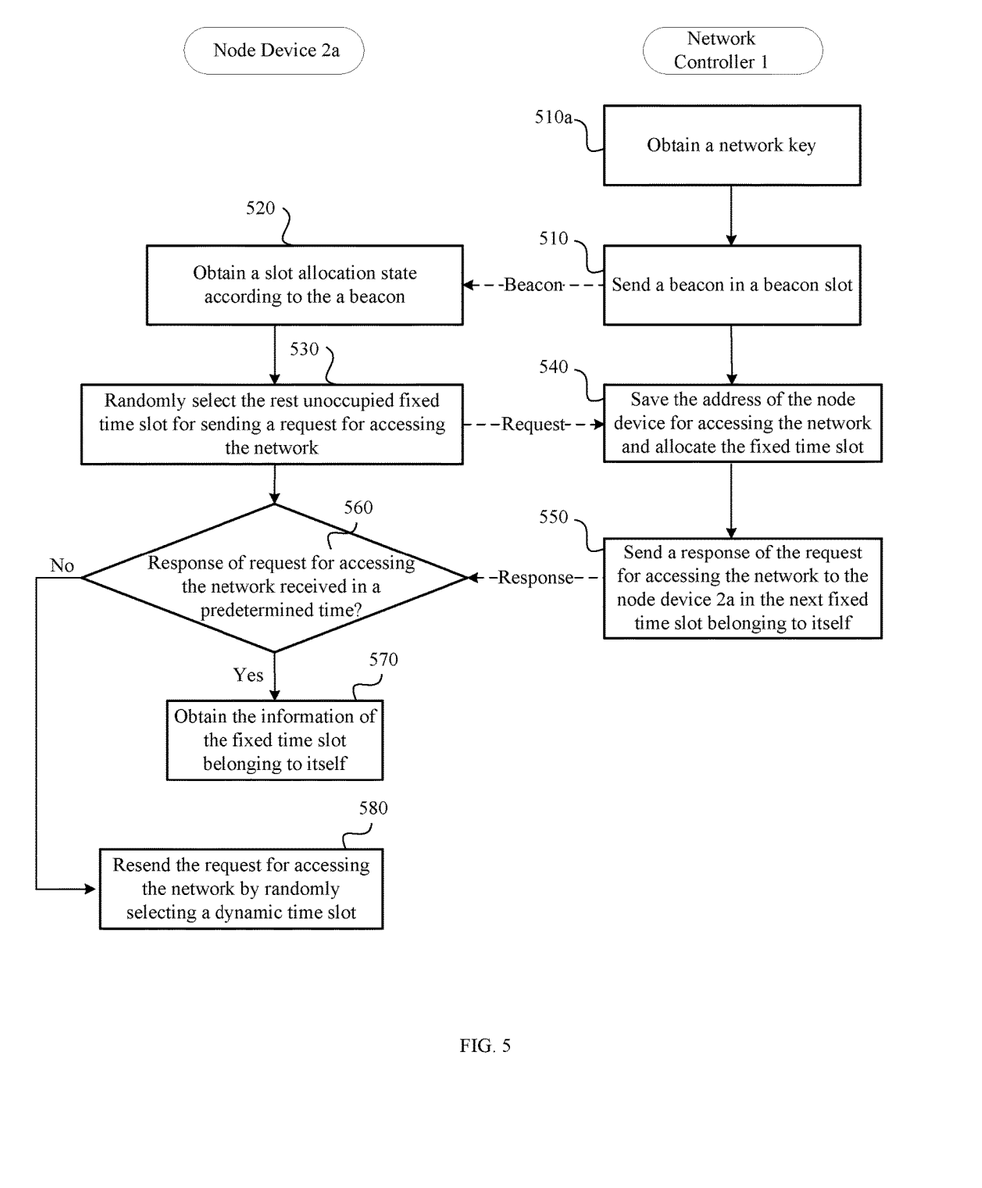
FIG. 5 is a flow diagram of an example networking operation of a mesh network system, in accordance with embodiments of the present invention.

Referring now to FIG. 5, shown is a flow diagram of an example networking operation of a mesh network system, in accordance with embodiments of the present invention. In this example, at 510, network controller 1 can periodically send beacons in beacon slots. The beacon can include information about the fixed time slot allocated by network controller 1 itself (e.g., the slot allocation state). The beacon also can include authentication information necessary for accessing the network (e.g., a network identifier and/or a device manufacturer identifier). The network identifier can be used to uniquely identify the mesh network system, which may only allow devices with the same network identification to access the network.

The device manufacturer identifier can be used to uniquely identify device manufacturers, which may allow devices manufactured by one or some manufacturers to access the network. For different applications, the above authentication approach and information can be combined to realize authentication for accessing the network. The authentication information can further include a network key or a network password. The network key can be obtained or further calculated by network controller 1 based on user input. Only the node devices with a matched network key in the request can be allowed to access the network. Accordingly, at network controller 1 side, e.g., at 510a, a network key can be obtained according to an user input, and a beacon can be constructed based on the authentication information at 510.

Figure 6:
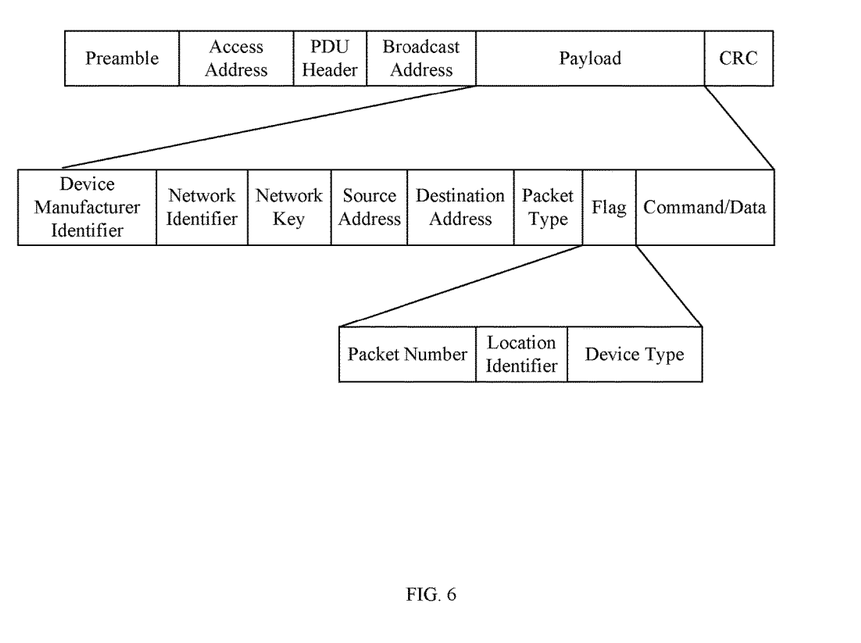
FIG. 6 is a diagram of an example data packet of a mesh network system, in accordance with embodiments of the present invention.

Referring now to FIG. 6, shown is a diagram of an example data packet of a mesh network system, in accordance with embodiments of the present invention. In this example, the packet header of the data packet of the mesh network system may be compatible with existing mesh network communication standard formats. The fields, such as the preamble, the access address, the PDU header, and the broadcast address, may be set in any suitable manner. The payload part can include device manufacturer identifier, network identifier, the network key, source address, destination address, packet type (or frame type), flag, and command or data carried by the data packet. The flag may include information, such as packet number, location identifier, and device type. For example, commands or data carried by the data packet can be encrypted by a network key, or the entire payload can be encrypted by the network key.

At 520, node device 2a that requests access to the network can obtain a current slot allocation state after receiving the beacon and synchronize according to the beacon. At 530, node device 2a may randomly select the remaining unoccupied fixed time slots in order to send a request for accessing the network. The request for accessing the network can be directly sent to network controller 1, or may be forwarded to network controller 1 by other node devices in the mesh network. The authentication information may be included in the request for accessing the network for authentication by the network controller when the network needs to be authenticated.

The authentication information may include a network identifier, a network key, and a device manufacturer identifier. The device manufacturer identifier can be used to distinguish whether the devices for sending the data packets are manufactured by the same or several manufacturers, such that the devices manufactured by other manufacturers can be excluded from the mesh network. The network identifier can be used to identify the mesh network such that a node device that requests access to network "A" may not be incorrectly added to network "B" when there are overlapping areas of different mesh network systems. The network key may be used to encrypt and decrypt interactive data in the internal of the mesh network system. The node device can encrypt the request for accessing the network based on the network key input by an user, or a pre-saved network key. The network controller may have a matching network key for decrypting the request for accessing the network based on the self-stored network key, and authenticating based on other authentication information. This can ensure whether the node device that sends the request is allowed to enter the mesh network system.

At 540, network controller 1 can save the address of the node device that requests for accessing the network according to the request for accessing the network, and may allocate the fixed time slot. For example, network controller 1 can allocate the fixed time slot that is used to send the request for accessing the network to node device 2a. Also, network controller 1 can allocate other unoccupied fixed time slots to node device 2a. When the network needs to be authenticated, network controller 1 can determine whether or not to process the request for accessing the network, or allow node device 2 to enter the network based on the authentication information.

At 550, network controller 1 can send a response of the request for accessing the network to node device 2a in the next fixed time slot belonging to itself. The response of the request for accessing the network can include information (e.g., a time slot flag) of one or several fixed time slots that are allocated to node device 2a by network controller 1. At 560, node device 2 can monitor whether or not the response of request for accessing the network is received in a predetermined time. If yes, the flow may proceed to 570, and otherwise may proceed to 580. At 570, node device 2a can decrypt the response of request for accessing the network, may obtain information about the fixed time slot belonging to itself, and can subsequently communicate in the corresponding fixed time slot.

At 580, node device 2a can resend a request for accessing the network by randomly selecting a dynamic time slot when the response of request for accessing the network timeouts. The procedure of resending the request at 580 may repeat for several times, until reaching a predetermined number of resend times, or obtaining the response of request for accessing the network. Step 570 may be referred as a back off step, which can effectively prevent a plurality of node devices from requesting access to the network at the same time slot, thus possibly avoiding a failure of accessing the network. For example, the response of a request for accessing the network can include response acknowledgement information, but not slot allocation information. Node device 1 can change the state to be online after receiving the response of the request for accessing the network, and may subsequently obtain the fixed time slot belonging to itself by receiving the beacon.

In this way, synchronization and broadcast of the slot allocation state of the fixed time slot can be based on the beacon, and the node device that requests access to the network can send the request by randomly selecting unoccupied time slots based on the above information. When the response of request for accessing the network timeouts, the request for accessing the network can be re-sent at the back off step, in order to guarantee the success rate for accessing the network, and avoid collision at the maximum extend. Network controller 1 can also send commands or other data to a target node device in the fixed time slot belonging to itself, or in the randomly selected dynamic time slot, besides sending beacons to provide synchronization and slot allocation state for the entire mesh network system. Also, node device 2 can send commands or information, such as the current operation state, collected environment parameters, etc., in the fixed time slot belonging to itself, or in the randomly selected dynamic time slot.

Figure 7:
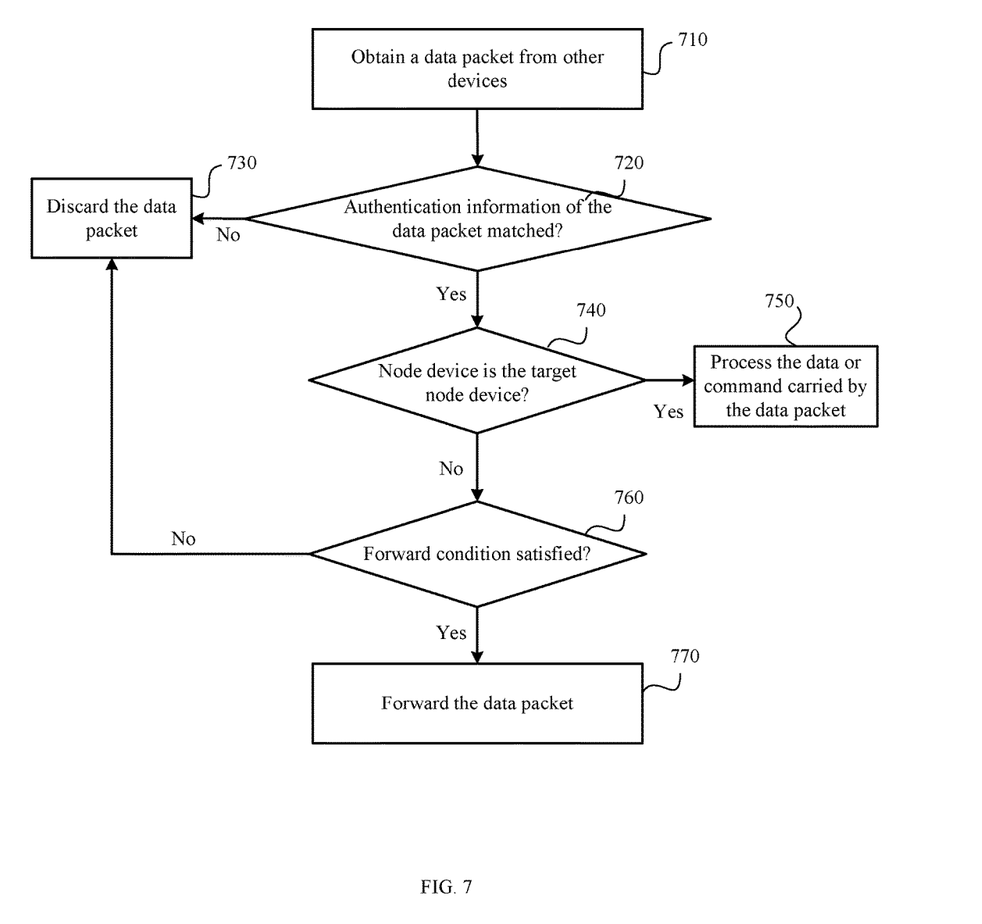
FIG. 7 is a flow diagram of example processing a received data packet by a node device in, in accordance with embodiments of the present invention.

Referring now to FIG. 7, shown is a flow diagram of example processing a received data packet by a node device in, in accordance with embodiments of the present invention. In this example, at 700, node device 2*b* can receive a data packet from other devices, such as network controller 1 or other node devices. At 720, node device 2*b* can detect whether or not the authentication information of the data packet (e.g., a device manufacturer identifier, a network identifier, a network key, etc.) matches with the stored authentication information. If not, the flow can proceed to 730, otherwise the flow can proceed to 740. Therefore, the node device in the mesh network system can effectively authenticate the received data packet, in order to improve the security of the network.

At 730, the data packet can be discarded. Because the authentication of the data packet cannot be matched in this case, it can indicate the received data packet is not sent by the legitimate device of the mesh network system, and thus the data packet may not be processed. At 740, it can be determined whether or not the destination address of the data packet matches the address of the node device is detected. If yes, the flow can proceed to 750, otherwise the flow can proceed to 760. At 750, if the node device is the target node device, data or commands carried by the data packet can be processed. For example, if the payload of the data packet is encrypted by a network key, it may need to decrypt and extract the data or commands in the payload of the data packet. At 760, if the destination address of the data packet does not match the address of the node device, whether or not the data packet satisfy forward condition can be determined. If yes, the flow can proceed to 770, otherwise the flow can proceed to 730.

The node device in the mesh network can be a terminal node or a relay node. However, if all node devices unconditionally forward the received packets, there may be a large number of duplicate forwarding of packets, or the data packets may be forwarded through a significantly wasteful routing path, which can result in a significant increase in expense and power consumption of the entire mesh network system. In order to overcome this possible defect, the forward condition of the data packet can be set to limit such duplicate forwarding and significantly wasteful forwarding. For example, the forward condition can be set as the data packet not being forwarded by this node before. In another example, node device 2 can determine whether or not to forward according to the forward times of the received data packet and a relative position of the network itself. Node device 2 may further modify the forward times of the data packet as part of the forwarding process.

The relative position of the network can represent the hops of the shortest path between a plurality of nodes and the controller, or may represent the levels of outward diffusion from the network controller. The relative position of node device 2 in the mesh network can be obtained by following steps. Network controller 1 can generate a command data packet and send the command data packet in a broadcast manner at the initial state or when the network topology needs to be updated. The node devices in the mesh network can forward the command data packet and confirm or update the relative position according to the minimum forward times when the command data packet arrives.

At 770, node device 2*b* can forward the data packet. For example, node device 2*b* can update the information related to the forward times in the data packet based on a predetermined strategy, and then forward the data packet. Therefore, a node device in the mesh network can effectively process the received data packet, in order to improve the forward validity and robustness of the network. Network controller 1 can process the received data packet in substantially the same fashion. However, when the size of the mesh network continues to expand, the number of fixed time slots may not be enough. Thus, the size of the network can be expanded, such as by providing more available time slots in one cycle between every two adjacent beacon slots.

Figure 8:
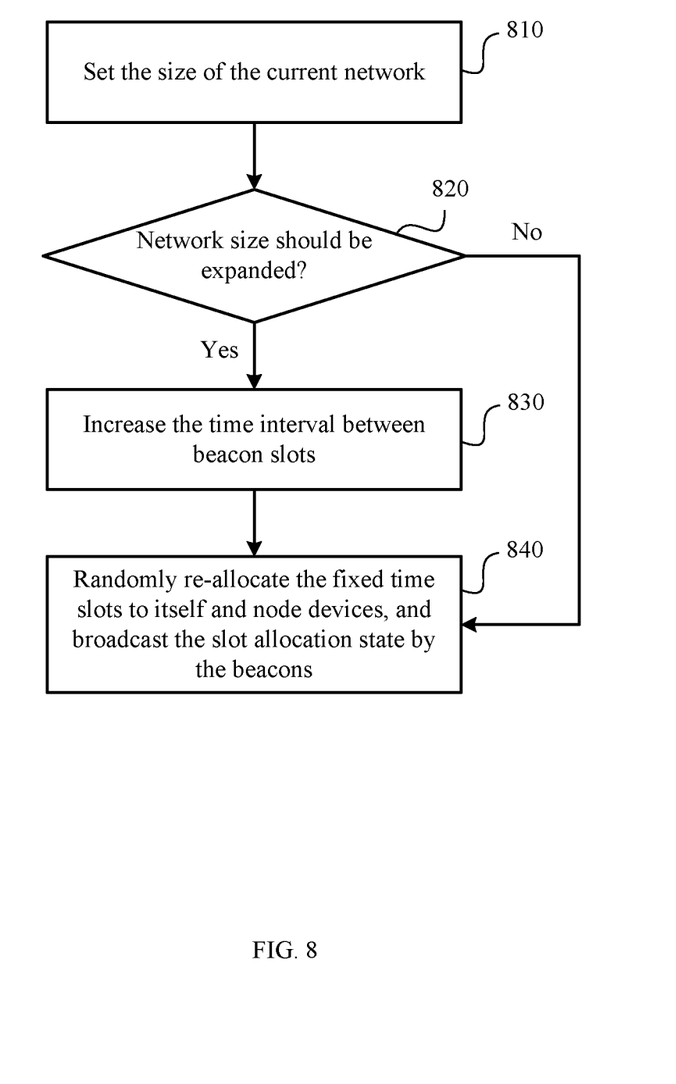
FIG. 8 is a flow diagram of example increasing the size of a network of a mesh network system, in accordance with embodiments of the present invention.

Referring now to FIG. 8, shown is a flow diagram of example increasing the size of a network of a mesh network system, in accordance with embodiments of the present invention. At 810, network controller 1 can set the network size (e.g., the number of the fixed time slots and dynamic time slots). At 820, network controller 1 can determine whether or not the network size should be expanded. If yes, the flow may proceed to 830, otherwise the flow can proceed to 840. For example, network controller 1 can determine whether or not the network size should be expanded based on the number of unoccupied fixed time slots.

At 830, network controller 1 can increase the number of the fixed time slots and dynamic time slots (e.g., the time interval between beacon slots). At 840, the fixed time slots can be randomly allocated to network controller 1 and the node devices in the mesh network system, and the slot allocation state can be broadcasted by beacons. For example, the fixed time slots that occupy a predetermined proportion (e.g., 20%) can be allocated to network controller 1, in order to increase the available time slots along with the increase of the network size. Thus, the frequency for sending the beacons can be regulated based on changes of the network size, in order to obtain better flexibility of the mesh network system.

Figure 9:
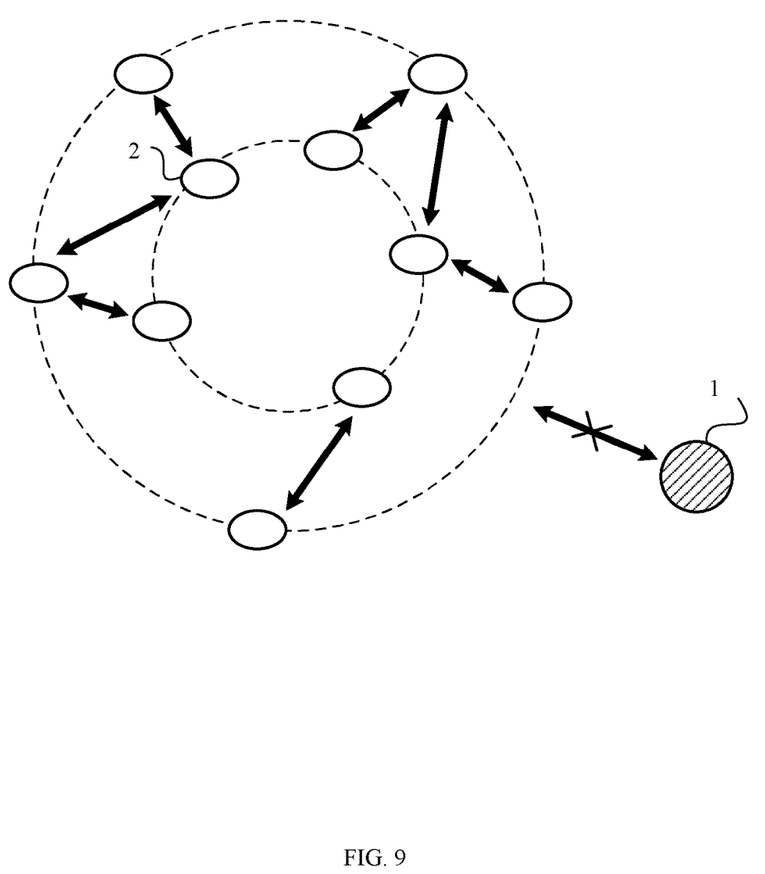
FIG. 9 is a topology diagram of an example mesh network system when a network controller leaves the communication area, in accordance with embodiments of the present invention.

Referring now to FIG. 9, shown is a topology diagram of an example mesh network system when a network controller leaves the communication area, in accordance with embodiments of the present invention. In some cases, network controller 1 may be likely to temporarily leave the communication area. For example, the user may use the intelligent mobile communication terminal as network controller 1, and each node device can be a home appliance. When the user leaves home, network controller 1 may leave the communication area of the mesh network. In this case, if node device 2 still normally initiates a data transfer operation, this may result in unnecessary power consumption and an increase of the overall system power consumption.

Figure 10:
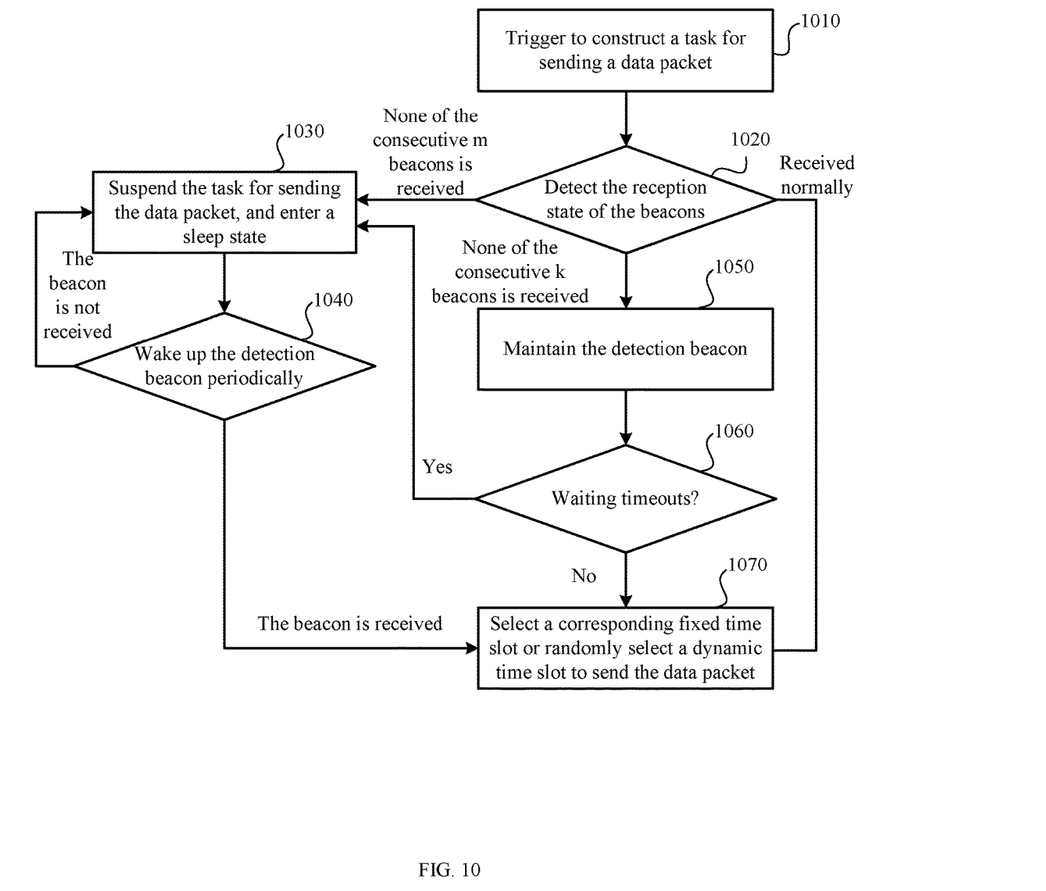
FIG. 10 is a flow diagram of example sending a data packet by a node device, in accordance with embodiments of the present invention.

Referring now to FIG. 10, shown is a flow diagram of example sending a data packet by a node device, in accordance with embodiments of the present invention. At 1010, node device 2*c* can be triggered to construct a task for sending a data packet. At 1020, node device 2*c* can detect the reception state of the beacons. If none of the consecutive "m" beacons is received (e.g., the m beacon periods do not receive the beacons), the process can proceed to 1030. If none of the consecutive "k" beacons is received, where k<m, then the process can proceed to 1050. If the beacons are continuously received, the process can proceed to 1070. At 1030, node device 2*c* can suspend the task for sending the data packet, and may enter a sleep state. At 1040, node device 2*c* is in the sleep state, and can periodically wake up the detection beacon. If the beacons are received, the process can proceed to 1070, and otherwise may proceed to 1030.

At 1050, node device 2c can maintain the detection beacon. At 1060, if the waiting time of node device 2c timeouts, the process can proceed to 1030, and otherwise it proceeds to 1070. At 1070, node device 2c can select a corresponding fixed time slot, or may randomly select a dynamic time slot for sending the data packet. Thus, effective prevention of the node device from sending data when the network controller leaves off can occur, in order to avoid power waste. In some cases, network controller 1 can remove particular node devices according to the user's indication, or some automatic trigger condition.

Figure 11:
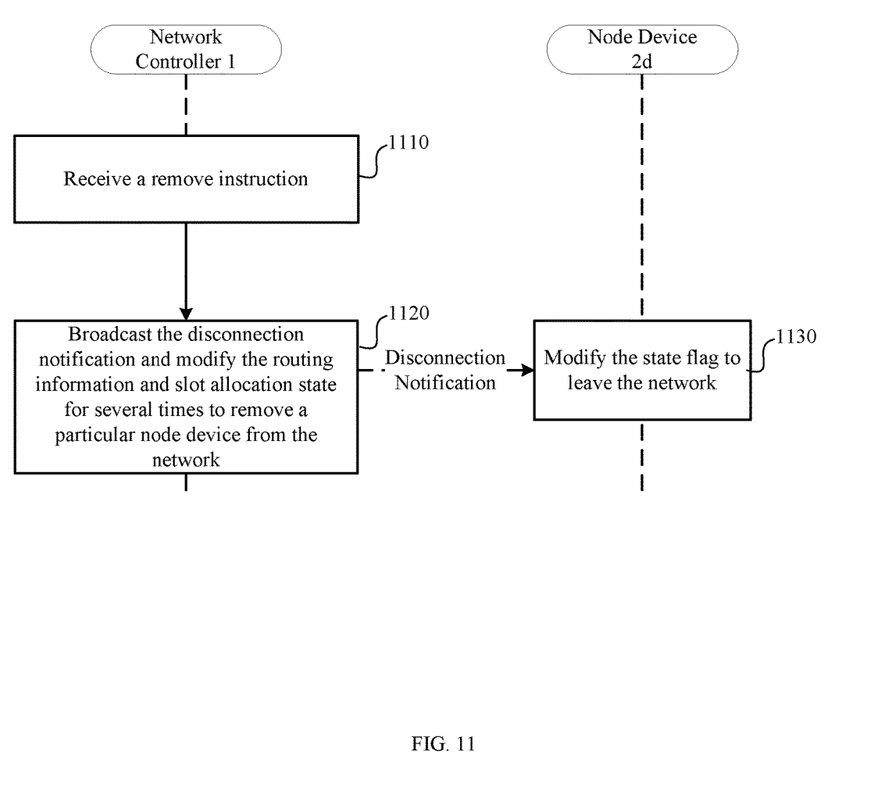
FIG. 11 is a flow diagram of example actively removing network nodes from a mesh network by a network controller, in accordance with embodiments of the present invention.

Referring now to FIG. 11, shown is a flow diagram of example actively removing network nodes from a mesh network by a network controller, in accordance with embodiments of the present invention. At 1110, network controller 1 can receive a remove instruction. At 1120, network controller 1 can broadcast a disconnection notification (e.g., repeat for 3 times) in a repeat way, and may modify the route information and slot allocation state, in order to remove the particular node device from the network. For example, the disconnection notification can include the flag of the particular node device. Here, the modification of the route information and slot allocation state may not require network controller 1 to receive the feedback of node device 2. At 1130, node device 2d that should be removed can receive the disconnection notification, and may modify the state flag to leave the network, in order to complete the disconnection operation.

If another node device 2e receives the disconnection notification, whether or not to forward can be determined according to the authentication process and forward condition shown in the example of FIG. 7. In some cases, node device 2 may leave the communication area on its own, and if network controller 1 does not know the latest state, the network topology may be changed already, and the node device and the network controller may still forward the data in the original way. The instability of the mesh network system may also lead to an increase in the overall power consumption of the mesh network due to unnecessary forwarding or invalid forwarding.

Figure 12:
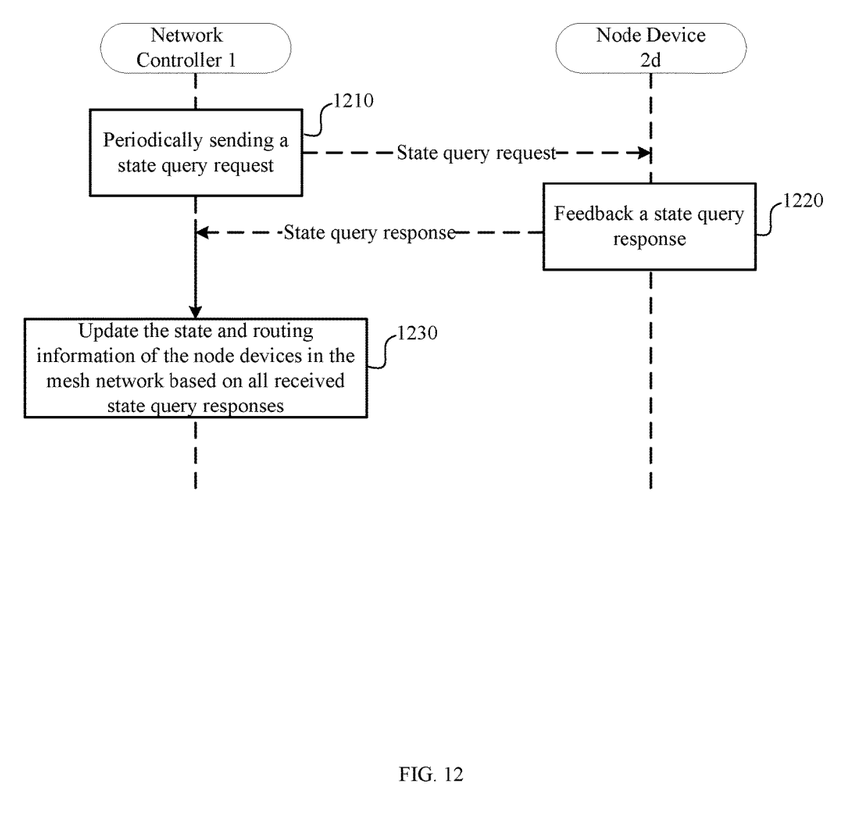
FIG. 12 is a flow diagram of example network state maintenance performed periodically by a mesh network system, in accordance with embodiments of the present invention.

Referring now to FIG. 12, shown is a flow diagram of example network state maintenance performed periodically by a mesh network system, in accordance with embodiments of the present invention. In this example, at 1210, network controller 1 can periodically send a state query request. At 1220, all node devices 2e that receive the state query request can feedback the response of the state query request to network controller 1. At 1230, network controller 1 may be aware of the node devices currently in the mesh network based on all received responses of the state query request, and can accordingly update the states and route information of the node devices in the mesh network. Thus, network controller 1 can accurately know changes of the network topology, in order to maintain the mesh network performs routing and data forwarding in an optimized way.

It will be readily appreciated that for network controller 1 and node device 2 of particular embodiments, the controller may be arranged to include any system, device, or apparatus configured to interpret and/or execute program instructions and/or process data, such as microprocessors, microcontrollers, digital signal processors (DSPs), application specific integrated circuits (ASICs), or any other digital or analog circuitries configured to interpret and/or execute program instructions and/or process data. In some embodiments, controllers 12 and 22 may interpret and/or execute program instructions and/or process data stored in a memory structure (not explicitly shown) that is communicatively coupled to the controller, in order to control other software or hardware circuits to perform the steps described herein.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. An apparatus, comprising:
   a) a network controller in a mesh network, said network controller being configured to send a beacon in a predetermined beacon slot in a broadcast manner, wherein said beacon comprises a slot allocation state of said mesh network; and
   b) a plurality of node devices, wherein each said node device is configured to synchronize according to said beacon, and to send a data packet within a corresponding fixed time slot according to said slot allocation state, wherein each of said fixed time slots corresponds to only one of said plurality of node devices;
   c) wherein said network controller is configured to increase a number of time slots in one cycle between said beacon slots when the size of said mesh network needs to be increased.

2. The apparatus of claim 1, wherein said plurality of node devices and said network controller are configured to send a data packet by randomly selecting a dynamic time slot, wherein said dynamic time slot and said fixed time slot are located between two adjacent beacon slots.

3. The apparatus of claim 1, wherein:
   a) each of said plurality of node devices is configured to obtain said slot allocation state according to said beacon when entering a network, and to randomly select an unoccupied fixed time slot to send a request for accessing said network to said network controller; and
   b) said network controller is configured to save a node device address corresponding to said request for accessing said network and allocate said fixed time slot, and to send a response of said request for accessing said network in a next corresponding fixed time slot.

4. The apparatus of claim 3, wherein each of said plurality of node devices is configured to resend said request for accessing said network by randomly selecting said dynamic time slot when said response of said request for accessing said networks timeouts.

5. The apparatus of claim 3, wherein:
   a) said request for accessing said network comprises authentication information of said mesh network;
   b) said authentication information comprises a network identifier, a network key, and a device manufacturer identifier;
   c) said network key is configured for encrypting and decrypting internal interactive data of said mesh network; and
   d) said network controller and said node device are configured to discard said data packet when said authentication information of a received data packet does not match self-stored authentication information.

6. The apparatus of claim 1, wherein said network controller is configured to reallocate said fixed time slots to said node devices in itself and said mesh network in a random manner, and broadcast said slot allocation state by said beacon.

7. The apparatus of claim 1, wherein:
a) said network controller is configured to send a state query request in a corresponding fixed time slot, and to update the states and route information of said plurality of node devices in said mesh network in response to said state query request from at least one of said plurality of node devices;
b) said network controller is configured to broadcast a disconnection notification in a repeat way, and to modify said route information and said slot allocation state when a particular node device is disconnected from said mesh network system; and
c) said particular node device is configured to change a state flag to off network after receiving said disconnection notification.

8. The apparatus of claim 1, wherein:
a) each of said plurality of node devices is configured to enter a sleep state when no beacon is received within a predetermined number of cycles in which said node device does not send said data packet; and
b) said node device is configured to wake-up a detection beacon at a certain timing in the sleep mode, and is re-entered an operation state when said beacon is detected.

9. The apparatus of claim 1, wherein each of said plurality of node devices is configured to determine whether or not to forward said data packet based on the number of times of forwarding said data packet and a relative position of its own network, and wherein said relative position represents the number of hops of a shortest path between said node device and said network controller.

10. A node device of a mesh network, the node device comprising:
a) a radio controllable to transmit and receive data; and
b) a control device being configured to synchronize according to a beacon of a network controller broadcasted in a beacon slot, and to send a data packet in the corresponding time slot according to a slot allocation state, wherein each of said time slots corresponds to only one node device of a plurality of node devices in said mesh network, wherein said control device is configured to obtain said slot allocation state according to said beacon when entering a network, and to randomly select an unoccupied fixed time slot to send a request for accessing said network to said network controller;
c) wherein said request for accessing said network comprises authentication information of said mesh network system, said authentication information comprises a network identifier, a network key configured for encrypting and decrypting internal interactive data of said mesh network system, and a device manufacturer identifier, and wherein said control device is configured to discard said data packet when said authentication information of a received data packet does not match self-stored authentication information.

11. The node device of claim 10, wherein said control device is configured to send a data packet by randomly selecting a dynamic time slot, wherein said dynamic time slot and said fixed time slot are located between two adjacent beacon slots.

12. The node device of claim 10, wherein said control device is configured to resend said request for accessing said network by randomly selecting said dynamic time slot when said response of said request for accessing said networks timeouts.

13. The node device of claim 10, wherein:
a) said control device is configured to enter a sleep state when no beacon is received within a predetermined number of cycles in which said control device does not send said data packet; and
b) said control device is configured to wake-up a detection beacon at a certain timing in the sleep mode and is re-entered an operation state when said beacon is detected.

14. The node device of claim 10, wherein said control device is configured to determine whether or not to forward said data packet based on the number of times of forwarding said data packet and a relative position of its own network, and wherein said relative position represents the number of hops of a shortest path between said node device and a network controller of a mesh network.

15. A network controller of a mesh network, the network controller comprising:
a) a radio controllable to transmit and receive data; and
b) a control device configured to generate a beacon comprising a slot allocation state of said mesh network, and to control said radio to send said beacon in a predetermined beacon slot, wherein said slot allocation state represents an allocation state of a fixed time slot;
c) wherein said network controller is configured to increase a number of time slots between said beacon slots when the size of said mesh network needs to be increased, reallocate said fixed time slots to a plurality of node devices in itself and said mesh network in a random manner, and broadcast said slot allocation state by said beacon.

16. The network controller of claim 15, wherein said control device is configured to send a data packet by randomly selecting a dynamic time slot, wherein said dynamic time slot and said fixed time slot are located between two adjacent beacon slots.

17. The network controller of claim 15, wherein said control device is configured to save a node device address corresponding to said request for accessing said network and allocate said fixed time slot, and to send a response of said request for accessing said network in a next corresponding fixed time slot.

18. The network controller of claim 17, wherein said request for accessing said network comprises authentication information of said mesh network system, wherein said authentication information comprises a network identifier, a network key, and a device manufacturer identifier.

* * * * *